United States Patent [19]

Schumacher et al.

[11] 4,164,423
[45] Aug. 14, 1979

[54] BLACK PIGMENTED UV HARDENING PRINTING INK

[75] Inventors: Wilhelm Schumacher, Hanau; Lothar Rothbühr, Hürth-Hermülheim; Joachim Armster, Bruchköbel, all of Fed. Rep. of Germany

[73] Assignee: Deutsche Gold- und Silber-Scheideanstalt vormals Roessler, Frankfurt, Fed. Rep. of Germany

[21] Appl. No.: 930,539

[22] Filed: Aug. 2, 1978

[30] Foreign Application Priority Data

Aug. 23, 1977 [DE] Fed. Rep. of Germany ....... 2738819

[51] Int. Cl.² .............................................. C09D 11/02
[52] U.S. Cl. ..................... 106/20; 106/307; 204/159.19; 204/159.23; 260/42.52; 427/54
[58] Field of Search ................................. 106/20, 307; 204/159.19, 159.23

[56] References Cited

U.S. PATENT DOCUMENTS

| | | |
|---|---|---|
| 3,383,232 | 5/1968 | Jordan et al. ........................ 106/307 |
| 3,620,792 | 11/1971 | Hagopian ............................ 106/307 |
| 3,660,133 | 5/1972 | Schuyt et al. ........................ 106/307 |
| 3,787,562 | 1/1974 | Heller et al. ......................... 106/307 |

FOREIGN PATENT DOCUMENTS 2358948  5/1975  Fed. Rep. of Germany .

*Primary Examiner*—Carman J. Seccuro
*Attorney, Agent, or Firm*—Cushman, Darby & Cushman

[57] ABSTRACT

There are prepared black pigment containing UV-drying printing inks in which there is employed for the black pigmentation a carbon black having the following physical and chemical properties:

| | | |
|---|---|---|
| BET surface area | m²/g | 20–50 |
| Particle diameter | nm | 30–80 |
| DBP adsorption | ml/100g | 30–100 |
| Volatile constituents | % | 3–10 |
| pH | | 3–6 |

The carbon black is produced by post oxidation of a coarse particled furnace black having the properties.

| | | |
|---|---|---|
| BET surface area | m²/g | 20–50 |
| Particle diameter | nm | 30–80 |
| DBP adsorption | ml/100g | 30–100 |

11 Claims, No Drawings

BLACK PIGMENTED UV HARDENING PRINTING INK

BACKGROUND OF THE INVENTION

The invention is directed to black pigmented UV-hardening printing inks.

UV hardening printing inks have been known for some time in the patent literature (see German AS No. 2,358,948, the entire disclosure of which is hereby incorporated by reference and relied upon). Recently, however, there have been develop UV-printing inks which have a certain aging experience. However, there are associated with all previously known UV-printing ink systems a series of deficiencies which in part are severe so that they could not previously be placed on the market.

In contrast to conventional printing inks, UV printing inks possess several potential advantages. They can be formulated completely free from solvent. For example in web printing they are substantially more favorable to the environment than conventional heat set printing inks in which in part considerable amounts of unburned or partially burned mineral oils are emitted into the atmosphere. In sheet printing, particularly in the production of high quality multicolor prints or in printing on low or non-absorbing printing materials, as special coated papers, metal or plastic soils, the speed of working because of the low speeds of the oxidative drying systems is frequently so low that there must be allowed up to 10 hours and more from printing to the further processing such as cutting, folding, etc., as a result of which the productivity is low, the capacity of the expensive printing machines not utilized and higher storage costs arise. In contrast with the UV-hardening printing inks an immediate drying after the sheet leaves the printer is attained on any kind of printing material without set-off problems in the pile or the need to cover them with powder.

Compared to conventional printing inks UV-printing inks also have several industrial printing advantages in regard to the quality of the printing. For example they permit the production of finished prints with higher rub-resistance. Through the possibility in multicolor printing to quickly dry or dry the surface after each individual color application the quality reducing false printing "doubling" is completely prevented. The difficult and frequently protracted exact formulation of the color sequence with viscosity gradations and tack gradations of the wet in wet printing, particularly in letter press printing, is simplified and made problem free by drying each individual color before the next application of color.

In order to actually attain all of these potential advantages of UV-printing inks compared to customary printing inks a UV-printing ink must satisfy the following four main requirements.

1. Hardening Speed

An extremely high hardening activity under UV light is necessary with the smallest possible number of heavy duty —UV—lamps, e.g., a Hg—high pressure lamp with a specific output of 80 watts per cm. arc length and per color coating. The economy of the process depends strongly on the investment costs of the UV drying plant used and of the energy and maintenance costs of the drying. In offset web printing the investment costs of a UV-drying unit are considerably less than with customary heat set hot drying units. However, the running operating costs with UV-hardening can be clearly higher if too high a lamp output must be installed if the hardening activity of the UV-inks is too low. In sheet printing, in the case of paper printing, investment costs and operating costs are newly added. These costs must compete with the cost savings through higher productivity in printing with UV-inks.

2. Using up in Printing

The industrial printing properties of the UV-printing inks in regard to viscosity, tack, viscosity and tack maintenance with changes in temperature and changes in speed of printing, especially the using up in printing at very high printing speeds, in offset printing additionally behavior against water, must correspond to the state of the art conventional printing inks. In order to attain a very quick UV-hardening UV-printing inks must be formulated completely different from conventional printing inks. In order to fulfill the here described requirements with the completely differently formulated printing ink binders, i.e. UV-printing inks must be able to be used up at high speeds of printing likewise free from problems as with conventional printing inks, it is not sufficient to put together a composition of quickly polymerizing materials frequently mentioned in the patent literature under "cross-linking monomers" or "photopolymerizable monomers." Selection and combination of individual components of the binder for UV-printing inks must take place very careful not only in regard to higher hardening speed but more especially also in regard to optimum using up.

3. Toxicity, Skin Irritation, Corrosiveness against Printing Machines and Printer's Copy Material.

In order to make possible a very quick UV-hardening in the synthesis of the photopolymerizable compounds there must be built in components which are more or less toxic as well as irritating to the skin and mucous membranes and which additionally can act to dissolve or swell the roller coating in the printing machine as well to dissolve or swell the coatings of the printing plates. Therefore the components concerned in the synthesis of the binder must be so constituted in their chemical structure and in their physical properties that the negative effects of the quickly polymerizing components are held as low as possible or eliminated.

4. Storage Stability

The printing inks should have as high as possible storage stability of at least 3 to 6 months. The storage stability under the exclusion of light depends substantially upon the stability of the monomers used and the thermal stability of the photoinitiator used.

The stability of the monomers, in the event that no too great a sensitivity is present, is regulated simply by addition of customary polymerization inhibitors. A large number of the photoinitiators generally known to those skilled in the art, particularly effective photoinitiators, however, even in the dark polymerization liberating radicals which are not able to be intercepted even by large amounts of inhibitors without hindering the photopolymerization. Therefore the photoinitiators used must be carefully selected particularly for very quick drying even with regard to storage stability.

Although it is known and customary to pigment printing inks black with carbon blacks of various origins, the known types of carbon black fail to work in using printing inks hardening with UV radiation. The printing inks with known types of carbon black are inclined to thicken with storage and to harden too slowly with the UV irradiation.

SUMMARY OF THE INVENTION

It is the purpose of the invention to develop black pigmented UV-hardening printing inks which are characterized by the black pigmenting is carried out with carbon black having the following physical chemical data.

| BET surface area | m²/g | 20-50 |
|---|---|---|
| Particle Size | nm | 30-80 |
| DBP-Adsorption (dibutyl phthalate adsorption) | ml/100g | 30-100 |
| Volatile constituents | % | 3-10 |
| pH | | 3-6 |

In a preferred form of the invention the UV-hardening printing inks of the invention for black pigmentation can contain a carbon black which is produced by post oxidation of coarse particled furnace blacks with a BET surface area of 20 to 50 m²/g, a particle diameter of 30 to 80 nm and a DBP adsorption of 30 to 100 ml/100 g.

The post oxidation can take place by leading $NO_2$ and air at temperatures between 80° and 200° C. over or through the carbon black to oxidize whereby after the reaction excess $NO_2$ is displaced by air. In the post oxidation the $NO_2$ can be 5 to 100% of the total of $NO_2$ air by volume, preferably 60-80% by volume.

The UV-hardening printing ink of the invention can contain the carbon black in an amount of 5 to 20 weight %, preferably 10 to 16 weight %, based on the printing ink.

The following analytical carbon black test methods were used to determine the physical-chemical characteristics of the carbon black.

| BET Surface Area Size: | Surface area size determination by nitrogen adsorption according to Brunnauer, Emmet and Teller - DIN 66131 (German Industrial Standard 66131) |
|---|---|
| Electron microscope particle diameter: | Electron microscope picture and measuring of the arithmetic average |
| DBP absorption: | ASTM D 2414/70 |
| Volatile constituents: | DIN 53522, but 1 gram weighed portion |
| pH | DIN 53200 |

The black pigmented UV-hardening printing inks of the invention have the following advantages.

They do not harden even upon 6 months storage. They dry extremely quickly and consequently result in rub resistant prints.

While the present invention is not limited to the UV-hardening printing inks of German AS 2,358,948 there can be employed such UV-hardening printing inks. As described in the German As the UV-irradiation hardening printing ink consists essentially of:

(A) up to 30 weight % of a pigment (B) 0.5 to 15 weight % of a mixture of Michler's ketone and benzophenone in a weight ratio of 1:10 to 10:1, preferably a weight ratio of 1:1.

(C) 25 to 90 weight % of an olefinically unsaturated compound of the acrylic type free of fatty acid residues having more than 6 carbon atoms, which compound contains at least one urethane group and has a molecular weight of 250 to 4000, preferably there is employed a mixture of a higher molecular weight component CI having a molecular weight of 800 to 4000, preferably 1000 to 2000 and a lower molecular weight component CII having a molecular weight of 250 to 800, preferably 350 to 600. As such acrylic materials with an olefinically unsaturated double bond, preferably of the (meth)-acrylic type

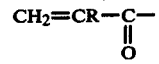

wherein R is hydrogen or methyl, and at least one, or preferably 2 to 6 urethane groups there can be used for example biuret and/or urea group containing polyfunctional isocyanates produced by reacting (a) di or trifunctional primary or primary-secondary amines as well as (b) bifunctional isocyanate with (c) an equivalent amount of a hydroxy group containing (meth) acrylic acid ester or N-methylol acrylamide ethers to form "urethaneacrylic compounds" and/or urethane group containing di-, tri- or tetrafunctional isocyanates produced by reacting (a') di, tri- or tetraols as well as (b) bifunctional isocyanates with (c) an equivalent amount of a hydroxy group containing (meth) acrylic acid ester or N-methylolacrylic acid ether to form "urethaneacrylic compounds."

Suitable amines (a) are straight or branched chain aliphatic or cycloaliphatic diamine of the general formula $H_2NRWH_2$, where R is an aliphatic or cycloaliphatic hydrocarbon residue having 1 to 20 carbon atoms, which optionally can have a $CO_1$ a NH or $NH_2$ group, such as for example, ethylene diamine, 1,2-propylene diamine, 1,3-diaminopropane, dipropylenetriamine, hexamethylene diamine, 2-aminomethylcyclopentylamine, 4,4'-diaminocyclohexylmethane, 3,3'-dimethyl, 4,4'-diaminodicylcohexylmethane, 2,2-bis(4-aminocyclohexyl)-propane, 1,20-diaminoeicosane.

Suitable, di,- tri or tetraols (a') are simple polyfunctional alcohols such as diols with 2 to 8 carbon atoms such as, for example, ethylene glycol, propylene glycol, 1,3-propanediol, butanediols, e.g. butanediol -1,4, pentanediols, hexanediols, e.g. hexanediol-1,8, octanediol-1,8, triols, e.g. glycerine, trimethylolpropane, hexanetriols, e.g. hexanetriol-1,2,6-pentaerythritol, etc. or polyether polyols produced by reacting 1 mole of alcohol with 1 to 10 moles of ethylene oxide or propylene oxide.

As bifunctional isocyanate (b) there can be used aliphatic or cycloaliphatic isocyanates of the formula OCN-R-NCO where R is a hydrocarbon group with 4 to 15 carbon atoms. Examples of such diisocyanates are hexamethylene diisocyanate, isophorone diisocyanate, bis-(4-isocyanatocyclohexyl)-methane, bis-(3-methyl-4-isocyanato-cyclohexyl)-methane, 2,2-bis (4-isocyanato-cyclohexyl)-propane, tetramethylene diisocyanate.

As hydroxy group containing (meth) acrylic compounds (c) there can be partial esters of used polyhydric alcohols with (meth) acrylic acid such as hydroxyethyl acrylate hydroxyethyl methacrylate, 1,2- or 1,3-propane diol mono acrylate or methacrylate, 1,4-butanediol monoacrylate or methacrylate, 1,6-hexanediol monoacrylate or methacrylate, trimethylolpropane diacrylate, glycerine diacrylate, pentaerythritol triacrylate as well as the mono (N-methylol (meth) acrylamide) ethers of ethylene glycol, propylene glycol, butanediol, hexanediol or neopentyl glycol (D) 5 to 35 weight % of at least one compound which contains the group

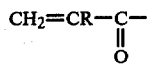

where R is hydrogen or a methyl group, at least once, or preferably 2 to 3 times in the molecule and has a vapor pressure at 100° C. of less than 1 Torr and is liquid at 50° C. Examples of component (D) there are especially suited compounds of the formula

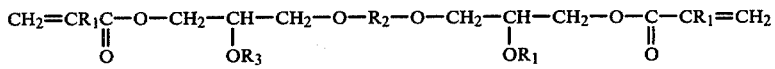

where $R_1$ is hydrogen or a methyl or cyano group and $R_2$ is a hydrocarbon group with 1 to 8 carbon atoms, $R_3$ and $R_4$ are the same or different and are hydrogen, alkyl of 1 to 4 carbon atoms or a, in a given case unsaturated, acyl group having 1 to 5 carbon atoms which can be produced for example by reaction of diglycidyl ethers of aliphatic diols or higher polyols, e.g. ethylene glycol, propylene glycol, propanediol-1.3, butanediol, hexanediol, diethylene glycol, biethylene glycol with at least one mole of acrylic acid or methacrylic acid per epoxide group.

and/or (E) 5 to 35 weight % of at least one compound which contains the group

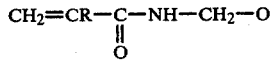

where R is hydrogen or methyl bonded at least once, or preferably two or three times to a branched chain alkyl group or cycloalkyl group with up to 12 carbon atoms which has a vapor pressure at 100° C. of less than 1 Torr and is liquid at 50° C. Preferably as component (E) (which can be used in place of or together with component D), there are preferably used the bis—N—methylolacrylamide ethers of neopentyl glycol, hydroxypivalic acid mono-ethylene glycol ester, -propanediol monoester, -butanediol monoester, -hexanediol monoester, or -neopentyl glycol monoester or esters from divalent alkyl substituted cycloaliphatic diols, as, e.g. cyclohexanediol or cyclopentanediol.

Thus, there can be used for Example the formulation of German AS No. 2,358,948 Example 1 with 10 parts by weight of the carbon black of the present invention. German AS No. 2,358,948 Example 1 contains:

Urethane acrylate A—30 parts by weight
Urethane acrylate B—44 parts by weight
N-methylolacrylamide ether HPNA—20 parts by weight
Michlers ketone—3 parts by weight
Benzophenone—3 parts by weight
Penothiazine—0.1 part by weight Urethane acrylate A is prepared by reacting biuretisocyanate (Desmodur M) with one equivalent of hydroxypropyl acrylate.

Urethane acrylate E is prepared by reacting 2 moles of hexamethylene diisocyanate with 2 moles of hydroxypropyl acrylate.

W-methylolacrylamide ether HPNA is hydroxypivalic acid neopentyl glycol ester -bis- (W-methylolacrylamide) ether.

It is again emphasized that the present invention is not limited to the use of the UV-drying printing inks of the above mentioned German AS and they are mentioned as illustrative only.

Unless otherwise indicated all parts and percentages are by weight.

The compositions of the invention can comprise, consist essentially of, or consist of the stated materials.

The black pigmented UV-hardening printing inks of the invention will be described in more detail in the following examples.

DESCRIPTION OF THE PREFERRED EMBODIMENTS

EXAMPLE 1

There were worked into a UV-hardening printing ink binder based on an acrylate the following carbon blacks:

|  | BET Surface Area $m^2/g$ | Electron microscope particle diameter nm | DBP absorption ml/100 | Volatile Constituents % | pH |
|---|---|---|---|---|---|
| Commercial Blacks | | | | | |
| Printex(R)V | 110 | 25 | 120 | 6 | 4 |
| Printex(R)400 | 95 | 23 | 45 | 2 | 10 |
| Printex(R)A | 46 | 41 | 120 | 2 | 9 |
| Printex(R)G | 31 | 51 | 95 | 2 | 9 |
| Printex(R)200 | 45 | 56 | 45 | 2 | 9 |
| Flame black 101 | 20 | 95 | 115 | 2 | 7 |
| Special black 4 | 180 | 25 | 110 | 14 | 3 |
| Special black 15 | 100 | 23 | 45 | 5 | 5 |
| Experimental Carbon Black of the Invention | | | | | |
| Carbon black 1002 | 19 | 85 | 112 | 3 | 3 |
| Carbon black 1003 | 30 | 50 | 95 | 5 | 5 |
| Carbon black 1005 | 45 | 40 | 45 | 3 | 3 |

The working in was carried out on a three roll mill, the carbon black concentration was 16 weight %.

The printing ink was printed on a manual printing machine and hardened in three passages with an impulse radiation drier at a working speed of 2 meters/sec. Immediately after the radiation influence in each case there was carried out a smearing test and the smeared pigmented film evaluated visually. High values indicate a strong smearing and therewith a poor hardening, low numbers indicate a good hardening. Besides the optical density of the prints was determined with a Baldwin densitometer.

|  | Smearing Effect after | | | Optical density |
|---|---|---|---|---|
|  | 1 | 2 | 3 Passages |  |
| Known printing inks with: | | | | |
| Printex V | 4 | 2.4 | 1 | 1.98 |
| Printex 400 | 3.5 | 2 | 1 | 1.75 |
| Printex A | 3 | 1.5 | 1 | 1.85 |
| Printex G | 3 | 2 | 1 | 1.70 |

-continued

| | Smearing Effect after | | | | Optical |
| --- | --- | --- | --- | --- | --- |
| | 1 | 2 | 3 | Passages | density |
| Printex 200 | 3 | 2 | 1 | | 1.73 |
| Lamp black 101 | 4 | 1 | 1 | | 1.70 |
| Special black 4 | 4 | 3 | 1 | | 1.95 |
| Special black 15 | 5 | 3 | 2 | | 1.85 |
| Printing inks according to the invention with: | | | | | |
| Carbon black 1002 | 2 | 1 | 1 | | 1.68 |
| Carbon black 1003 | 2.5 | 1.5 | 1 | | 1.66 |
| Carbon black 1005 | 2 | 1 | 1 | | 1.75 |

The black pigmented printing inks according to the invention clearly dried with UV-radiation more quickly than the commercial carbon blacks. The optical density was sufficient for the result sought.

EXAMPLE 2

The printing inks described in Example 1 were fitted into firmly closed storage containers and stored in a climate controlled room at 23° C. After six months the storage container was opened and there was attempted the measurement of the viscosity according to DIN 53222 (outline of July, 1976). In connection therewith the following results were obtained.

| Known Printing Inks | Viscosity [P] | Yield Value [dyn/cm$^2$] |
| --- | --- | --- |
| Printex$^{(R)}$V | polymerized | solid |
| Printex$^{(R)}$400 | polymerized | solid |
| Printex$^{(R)}$A | polymerized | solid |
| Printex$^{(R)}$G | polymerized | solid |
| Printex$^{(R)}$200 | polymerized | solid |
| Lamp black 101 | polymerized | solid |
| Special black 4 | polymerized | solid |
| Special black 15 | 573 | 1000 |

After six months all inks with one exception containing the added commercial carbon blacks were hardened. The single exception was the product special black 15.

| Printing ink according to the invention with | Viscosity [P] | Yield Value [dyn/cm$^2$] |
| --- | --- | --- |
| Carbon black 1002 | 571 | 400 |
| Carbon black 1003 | 680 | 500 |
| Carbon black 1005 | 510 | 200 |

Since it is required that a printing ink must be kept at least one half year without deterioration of properties all of the commercial carbon blacks with the exception of special black 15 were eliminated. Besides only the printing inks of the invention with coarse particled carbon blacks 1002, 1003 and 1005 showed a viscosity which permitted a printing:

EXAMPLE 3

The four printing inks obtained after 6 months storage and containing the carbon blacks
  Special black 15
  Carbon black 1002
  Carbon black 1003
  Carbon black 1005
were printed with an experimental printing apparatus on white rigid polyvinyl chloride (PVC) foils with an ink coating weight of about 2.5 g/m$^2$. Subsequently the hardening was carried out with a low energy quartz lamp having 40 W/cm at a 3 second time of influence. Immediately after the radiation action a smear test was carried out and the smeared pigmented films evaluated visibly. High numbers indicate an unfavorable value, many smears, poor hardening, low numbers mean the reverse:

| | Special black 15 | Carbon black 1002 | Carbon black 1003 | Carbon black 1005 |
| --- | --- | --- | --- | --- |
| Smeared after printing and hardening | 4 | 2.5 | 2 | 2 |
| Optical density of the prints | 1.55 | 1.52 | 1.74 | 1.64 |

The two carbon blacks 1003 and 1005 show the best printability and the quickest hardening as evidenced by the low smear test value. The optical density was sufficient for the results sought.

EXAMPLE 4

The four printing inks obtained after 6 months storage were printed on art paper in the manner given in Example 3 and subjected to a smearing test. The duration of the radiation in this case is 1 second.

| | Special black 15 | Carbon black 1002 | Carbon black 1003 | Carbon black 1005 |
| --- | --- | --- | --- | --- |
| Smeared after printing and hardening | 4 | 2.5 | 2 | 2 |
| Optical density of the prints | 1.85 | 1.68 | 1.66 | 1.75 |

Also in these tests the two carbon blacks 1003 and 1005 showed the best hardening.

The carbon blacks of Examples 1 to 4 used in the UV-hardening printing inks of the invention had the following physical-chemical properties:

| | BET Surface Area m$^2$/g | Electron microscope particle diameter nm | DBP Absorption ml/100 | Volatile Constituents % | pH |
| --- | --- | --- | --- | --- | --- |
| Carbon black 1002: | 19 | 85 | 112 | 3 | 3 |
| Carbon black 1003: | 30 | 50 | 95 | 5 | 5 |
| Carbon black 1005: | 45 | 40 | 45 | 3 | 3 |

What is claimed is:

1. In a UV-drying printing ink having a black pigment therein the improvement comprising employing as the black pigment a carbon black having the following physical and chemical properties:

| BET surface area | m$^2$/g | 20–50 |
| --- | --- | --- |
| Particle diameter | nm | 30–80 |
| DBP adsorption | ml/100g | 30–100 |
| Volatile constituents | % | 3–10 |
| pH | | 3–6 |

2. A printing ink according to claim 1 wherein the carbon black is obtained by post oxidation of large particled furnace black having the following properties:
  BET surface area—20–50 m$^2$/g
  Particle diameter—30–80 nm, and
  DBP adsorption—30–100 ml/100 g 3. A printing ink according to claim 2 wherein the post oxidation is carried out with $NO_2$ and air at 80 to 200° C. and the excess $NO_2$ is replaced by air after the reaction.

4. A printing ink according to claim 3 wherein the UV-drying ink comprises a UV-drying acrylate.

5. A printing ink according to claim 4 containing 5 to 20 weight % of the carbon black based on the weight of the printing ink.

6. A printing ink according to claim 2 containing 5 to 20 weight % of the carbon black based on the weight of the printing ink.

7. A printing ink according to claim 6 containing 10 to 16 weight % of the carbon black.

8. A printing ink according to claim 2 wherein the UV-drying ink comprises a UV-drying acrylate polymer.

9. A printing ink according to claim 1 containing 5 to 20 weight % of the carbon black based on the weight of the printing ink.

10. A printing ink according to claim 9 containing 10 to 16 weight % of the carbon black based on the weight % of the printing ink.

11. A printing ink according to claim 1 where the UV-drying ink comprises a UV-drying acrylate.

* * * * *